United States Patent Office 3,198,667
Patented Aug. 3, 1965

3,198,667
METHOD OF IMPREGNATING POROUS
ELECTRODE WITH CATALYST
Elroy M. Gladrow, Edison Township, Middlesex County, and Charles E. Thompson, Fanwood, N.J., assignors to Esso Research and Engineering Company, a corporation of Delaware
No Drawing. Filed Mar. 31, 1961, Ser. No. 99,683
6 Claims. (Cl. 136—122)

This invention relates to the production of electrical energy. In particular, this invention relates to improved fuel cell electrodes and to a novel method for the preparation of such electrodes. More particularly, this invention relates to a method of impregnating porous electrodes with catalyst so as to effect a more complete and uniform distribution of the catalyst within the pores of the electrode.

The term "fuel cell" is used in the art to denote a device for converting chemical energy released by the oxidation of a combustible fuel, e.g., hydrogen, carbon monoxide, hydrocarbons, oxygen-substituted hydrocarbons, etc. into electrical energy. The fuel cell differs from the ordinary dry or wet cell storage battery in that fuel and oxidant, e.g., oxygen gas, air, etc., are fed to the cell from an outside source while it is operating as opposed to having the fuel and oxidant stored within the unit. Furthermore, in the fuel cell the electrodes are neither consumed nor deactivated by the reaction occurring within the cell whereas in most conventional batteries at least one electrode is sacrificial, i.e., serves as fuel and is consumed with use. The unique value of the fuel cell lies in its ability to convert chemical energy to electrical energy continuously and with a greater efficiency than conventional means of power production. A fuel cell includes at least one fuel electrode and at least one oxygen electrode, an electrolyte providing ionic conductance between such electrodes, means for passing an oxidizing gas into dual contact with electrolyte and oxygen electrode, means for passing fuel into dual contact with electrolyte and fuel electrode and means for electron conduction between fuel electrode and oxygen electrode external to such electrolyte. The terms "anode" and "fuel electrode" are used interchangeably herein as are the terms "cathode" and "oxygen electrode."

The fuel cell reaction comprises the sum of complementary half cell reactions occurring at the anode and cathode, respectively. It is a fundamental principle in the design of fuel cells that the rate of electrochemical reaction depends upon the areas within the cell that are simultaneously exposed to the conductor and catalyst of the anode, the electrolyte and the fuel in the anodic portion of the cell and to the conductor and catalyst of the cathode, the electrolyte and the oxidant in the cathodic portion of the cell. The desideratum is therefore to bring electrolyte, electrode and reactant all into contact with each other at as great a number of sites as possible within the space limitations of the cell. Porous electrodes were early suggested to bring about this union. Porous carbon has been found to be a suitable material for the construction of an electrode base since it provides large surface areas per unit of volume and is of itself a relatively good electron conductor. In a relatively low temperature fuel cell, i.e., a cell operating at temperatures in the range of 70° F. or below upwards to 400° to 500° F., it has been the practice to associate with the carbon base of the electrode a catalytic element or compound. Such catalysts usually comprise a metal or metal-containing compound. Such catalysts have been discussed widely in the art as to their composition, their use with various electrolytes and their comparative qualities when employed to catalyze one or the other of the two half cell reactions.

This invention is not concerned with the use of a particular catalyst at either electrode but rather relates to an improved method for distributing such catalysts more effectively through the electrode base so as to create a greater number of potential reaction sites on or within the electrode structure thereby increasing the volume efficiency of such electrode. Therefore, although porous carbon is probably the most commonly employed nonmetallic electrode base material and is used herein to illustrate the invention, the process of this invention is applicable to use with any porous electrode base to which a metal or metal-containing compound is introduced to increase catalytic activity. Thus, such process would be applicable to other porous electrodes, such as carbon comprising electrodes wherein carbon particles are mixed or combined with various organic polymeric materials and for distributing a second metal within a porous metal structure.

The impregnation of diffusion type fuel cell electrodes with catalyst is complicated by the structural requirements of such electrodes. In order to provide the highest volume efficiency such electrodes should have a dual porosity. Thus, such electrodes are characterized by having pores distributed mainly in two regions of sizes, namely, diameters of from about 80 to 300 A. and from about 3,000 to 80,000 A. When properly functioning space within the larger pores is occupied with gas, i.e., fuel or oxidant, or liquid fuel and space within the smaller pores is occupied by electrolyte. The effectiveness of the electrode is limited by the number of intersections of the smaller pores with the larger pores. The value of the intersection as a reaction site is dependent upon the positioning of catalyst at the gas-liquid interface formed at such intersection in cell operation and to the effectiveness of the catalyst so positioned.

Heretofore, porous electrodes have been impregnated with catalyst by reducing the pressure on the material to be treated and flooding the porous structure with a relatively concentrated aqueous solution containing the catalytic material in ionic form, e.g., a 0.1 to 0.5 molar solution of chloroplatinic acid where the catalyst to be left on the conductor base is platinum. Adsorption of the catalyst in amounts in the range of about 0.1 to 2.0 wt. percent in the case of noble metal catalysts and amounts in the range of about 1 to 10 wt. percent with other metal and metal-containing catalysts is effected in a period ranging from about 1 to 4 hours. After adsorption the electrode is ordinarily heated to elevated temperatures in an inert atmosphere to decompose the adsorbed material leaving the metal-containing constituent on the surface of the conductor base. Where the intended catalyst comprises elemental metal this step is followed by reduction at elevated temperatures with hydrogen or other reducing agents. With other catalysts, such as cobalt molybdate, manganese molybdate, etc., the adsorption and decomposition steps are repeated with separate solutions of suitable reactants under conditions suitable for forming such compounds in situ.

It has now been discovered that a more effective electrode may be prepared from the same porous base and the same or even smaller quantities of catalyst by a time controlled adsorption of the catalytic material from highly diluted aqueous solutions of the catalyst-yielding substance in accordance with the method hereinafter set forth in detail. It is submitted that the marked improvement in activity demonstrated by electrodes prepared in accordance with this invention is attributable to both a more complete distribution of catalyst within the porous structure and to a different formation of catalytic particles at the points of deposition.

In accordance with this invention the impregnation of the electrode with catalyst is controlled within the following process limitations. The porous carbon electrode material is initially burned out with $CO_2$ at about 1800° F. and for about 6 hours to establish the desired porosity and distribution of pores. The electrode, at room temperature, is placed in a vessel and purged by evacuating the system to a subatmospheric pressure, e.g., 1 to 100, preferably 1 to 10 mm. Hg and flushing with an inert gas, such as nitrogen, helium, argon. This step is not particularly critical, but it is desirable to flush out residual adsorbed gases such as oxygen and water vapor. If desired, the vessel containing the electrode may be kept evacuated until such time as the impregnating solution is added. The impregnating solution is added to the vessel containing the electrode. In the case where the active catalytic agent is platinum or some other noble metal, the concentration is adjusted to about 0.001 to 0.075, preferably 0.005 to 0.03 molar. The volume of impregnating solution used is dictated by the final amount of catalyst desired on the electrode. The electrode is left immersed in the dilute solution of the catalytic agent for a time period of about 1 to 5 days, during which period the catalytic agent is imbibed by the porous carbon and is distributed more uniformly throughout the carbon than when more conventional impregnating techniques are employed. If desired, after the impregnating solution is added, the system may be periodically evacuated and flushed with helium or nitrogen. The electrode is finally withdrawn from the solution and dried, heated to decompose the adsorbed catalyst containing material and the catalyst reduced in the conventional manner.

The metals which may be distributed throughout a porous fuel cell electrode in accordance with this invention include those of the noble metals, e.g., gold, silver, patinum, palladium, rhodium, iridium, etc., as well as the transition group metals, e.g., Co, Ni, Cr, Mo, W, V, and their oxides or sulfides, and mixtures thereof. The method may also be used for the positioning of other catalysts, such as molybdates, tungstates, manganates, chromates, columbates, vanadates, titanates. Catalyst yielding forms of these materials suitable for use with this invention include water-soluble salts of the various metals, e.g., auric chloride, ammonium molybdate, cobalt acetate, iridium tribromide, chromium nitrate, etc.

The following examples are for purposes of illustrating the present invention and the details thereof should not be construed as limiting the true scope of the invention as set forth in the claims.

EXAMPLE 1

A carbon electrode in the form of a right cylinder having a diameter of 0.75 inch and a length of 1.75 inches and having a hole bored into it along the center axis of 0.375 inch diameter and 1.56 inch depth is subjected to an atmosphere of $CO_2$ at 1832° F. for 6 hours and cooled in $CO_2$ to effect the desired pore structure. The electrode is placed in a vessel, hole end up, evacuated and flushed three times with nitrogen. To the vessel are added 75 ml. of a 0.019 molar solution of chloroplatinic acid. After standing for 30 minutes the vessel is evacuated to remove adsorbed gases and dissolved gases from the system, and nitrogen added back to atmospheric pressure. This procedure is repeated and the electrode left in the solution for 3 days at atmospheric pressure in nitrogen. The electrode is removed from the vessel and dried in air at 230° F. Analysis of the residual liquid for platinum showed that the carbon had imbibed platinum in an amount constituting 1.6 wt. per cent of the total electrode. This electrode, which was made according to the teachings of this invention is referred to as electrode "A" in a subsequent example.

EXAMPLE 2

A carbon electrode similar to that described in Example 1 was treated with $CO_2$, cooled, placed in a vessel, hole end down, evacuated and flushed three times with helium. Five ml. of a 0.164 molar solution of chloroplatinic acid are added. This is slightly more liquid than necessary to cover the electrode. The system is left to stand for 4 days. The electrode is withdrawn from the liquid, and dried at 230° F. This electrode comprises 1.0% platinum and is designated "B" in subsequent examples.

EXAMPLE 3

A carbon electrode similar to that described in Example 1 is heated in $CO_2$, cooled, placed in a vessel, hole end up, evacuated and flushed with inert gas. Seven ml. of a 0.115 molar solution of chloroplatinic acid are added to the vessel. After soaking for 30 minutes the vessel is evacuated and flushed with nitrogen and left to stand for three days. The electrode is removed from the solution and dried at 230° F. The electrode comprises 1.0% Pt and is designated "C" in subsequent examples.

EXAMPLE 4

A carbon electrode similar to that described in Example 1 is heated in $CO_2$, cooled, and placed in a vessel. To this vessel are added 150 ml. of a 0.10 molar solution of cloroplatinic acid. The vessel is then evacuated to reject adsorbed gases from the pores. After 30 minutes atmospheric pressure is restored and the electrode soaked in the solution at 180° F. for six hours. The electrode is removed from the solution and dried at 230° F. This electrode comprises 1.50% Pt and is designated "D" in subsequent examples.

EXAMPLE 5

Electrodes "A," "B," "C" and "D" were sectioned and each section analyzed for platinum content. The electrode is mounted in a lathe and six cuts, each cut being 25 mils thick. The residue, which is about 37 mils thick, represents a seventh section. The fractions were digested in aqua regia to dissolve all the platinum, and filtered. The resulting solution, brought to known volume is analyzed spectrophotometrically using the absorption peak at 450 m$\mu$ as the basis. The results of the analysis of the three innermost and most difficult to impregnate sections are presented in the following table.

Pt content (Mg Pt/g. sample normalized to 100%)

| Electrode | A | B | C | D |
|---|---|---|---|---|
| 3 | 13 | 13 | 14 | 21 |
| 4 | 12 | 8 | 4 | 10 |
| 5 | 10 | 6 | 6 | 5 |

These data show conclusively that catalyst impregnation of electrodes in accordance with this invention with dilute solutions of noble metals gives a much more uniform distribution of the active catalyst throughout the porous electrode (cf. "A"). In a dilute solution, the catalytic metals' ions have a greater mobility to allow deeper penetration of the porous structure than those corresponding ions in a more concentrated solution.

EXAMPLE 6

This example is offered to show that the uniformity of the distribution of the catalytic agents in an electrode affect its performance. Electrodes were made by identical procedures described in making electrodes "A" and "D." The active catalyst comprised 1 to 1.5 wt. per cent of the total weight. The active catalytic components were 95 parts Pt and 5 parts Au. After drying, the electrodes were heated at 1000° F. for 4 hours to reduce the noble metals to their elementary state. The electrodes were tested as fuel electrodes for the conversion of ethane to useful electrical energy. The electrolyte was 30% $H_2SO_4$ and the temperature maintained at 180° F. A suitable oxygen electrode was installed to complete the cell. Performance data are shown below.

| | Current Density Max.,[2] Amps./Ft.[2] | Volts Polarization [1] Amps./Ft.[2] | | |
|---|---|---|---|---|
| | | 0 | 2 | 5 |
| "A" | 6.8 | 0.34 | 0.47 | 0.57 |
| "D" | 3.5 | 0.48 | 0.61 | |

[1] Volts polarization from a theoretical ethane electrode, i.e. theoretical maximum resulting from energy change in electrochemical oxidation of ethane to $CO_2$.

[2] By maximum current density is meant the maximum amount which the electrode is capable of producing. All other things being equal this property furnishes a comparison of the relative catalyst efficiencies. The units for expressing current density are amperes per square foot of bulk external area of the carbon cylinder.

The data show conclusively that the performance of the electrode (other factors being equal) is a result of the dispersion of the catalytic agent through the porous electrode. By the method which is our invention, electrode performance is substantially improved, both as pertains the potential available under constant load and the maximum current available from the electrode.

What is claimed is:

1. In a method for distributing a metal comprising catalyst through the pores of a porous carbon electrode which comprises contacting said electrode with a solution of a water soluble compound containing said metal in combined form, adsorbing said compound on said carbon, heating said electrode in an inert atmosphere to decompose said compound leaving said metal adhered to said carbon in an amount comprising at least 0.1 wt. per cent of the resulting metal impregnated carbon electrode, the improvement which comprises reducing the pressure on said electrode to a subatmospheric pressure, passing an inert gas through said porous electrode until said electrode is flooded with said gas, contacting the resulting gas flooded electrode at a pressure in the range of about 1 to 100 mm. Hg with an aqueous solution of said compound wherein the concentration is in the range of about 0.003 to 0.005 mole per liter for a period in the range of about 1 to 5 days, removing said electrode from said solution, heating said carbon electrode with said compound adsorbed thereon in an inert atmosphere until said compound is decomposed leaving said metal adsorbed on said carbon and treating the resulting electrode with hydrogen gas at an elevated temperature to activate said catalyst.

2. A method in accordance with claim 1 wherein said metal is platinum.

3. In a method for distributing a metal comprising catalyst through the pores of a porous carbon comprising electrode which comprises contacting said electrode with a solution of a water soluble compound containing said metal in combined form, adsorbing a predetermined amount of said compound on said electrode, heating said electrode in an inert atmosphere to decompose said compound leaving said metal adhered to said carbon, the improvement which comprises contacting said electrode under a reduced pressure in the range of about 1 to 100 mm. Hg with an aqueous solution of said compound wherein the concentration of said compound is in the range of about 0.001 to 0.05 mole per liter for a period of from 1 to 5 days.

4. A method in accordance with claim 3 wherein the pressure upon said electrode is reduced at the time of initial contact with said solution.

5. A method in accordance with claim 4 wherein the pressure upon said electrode is reduced after contact with said solution.

6. A method in accordance with claim 4 wherein said pressure is in the range of about 1 to 10 mm. Hg.

References Cited by the Examiner

UNITED STATES PATENTS

| 2,332,817 | 10/43 | Smith | 117—113 |
| 2,409,295 | 10/46 | Marvin et al. | 117—113 |
| 2,847,332 | 8/58 | Ramadanoff | 117—228 |
| 2,935,547 | 5/60 | Kordesch | 136—86 |

JOHN H. MACK, *Primary Examiner.*

JOHN R. SPECK, *Examiner.*